US008705340B2

(12) United States Patent
Gong et al.

(10) Patent No.: US 8,705,340 B2
(45) Date of Patent: Apr. 22, 2014

(54) PACKET-LOSS HANDLING FOR DOWNLINK MULTI-USER MULTIPLE-INPUT AND MULTIPLE-OUTPUT WIRELESS NETWORK

(75) Inventors: Michelle Xiaohong Gong, Sunnyvale, CA (US); Adrian P. Stephens, Cambridge (GB); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 992 days.

(21) Appl. No.: 12/655,086

(22) Filed: Dec. 23, 2009

(65) Prior Publication Data

US 2011/0149723 A1    Jun. 23, 2011

(51) Int. Cl.
*H04L 1/00*       (2006.01)
(52) U.S. Cl.
USPC .......................... 370/216; 370/231; 370/235
(58) Field of Classification Search
USPC ......... 370/216, 229, 230, 231, 235, 236, 241, 370/242, 252, 328, 329, 338
See application file for complete search history.

(56) References Cited

U.S. PATENT DOCUMENTS

| 2007/0104171 A1* | 5/2007 | Kasami et al. ............... 370/339 |
| 2007/0133459 A1* | 6/2007 | Kim et al. .................... 370/329 |
| 2007/0254652 A1* | 11/2007 | Khan et al. ................. 455/435.1 |
| 2009/0109904 A1* | 4/2009 | Gaur ........................... 370/329 |
| 2009/0154372 A1 | 6/2009 | Wang et al. |
| 2009/0213741 A1 | 8/2009 | Wang et al. |

FOREIGN PATENT DOCUMENTS

| JP | 2006-352545 A | 12/2006 |
| JP | 2008-022453 A | 1/2008 |
| JP | 2011-507398 A | 3/2011 |
| KR | 10-2008-0110175 A | 12/2008 |
| WO | 2005/083965 A1 | 9/2005 |
| WO | 2005/119986 A1 | 12/2005 |
| WO | 2006/055646 A2 | 5/2006 |
| WO | 2007/022126 A2 | 2/2007 |
| WO | 2008/131971 A1 | 11/2008 |
| WO | 2009/075900 A1 | 6/2009 |
| WO | 2011/087613 A2 | 7/2011 |
| WO | 2011/087613 A3 | 11/2011 |

OTHER PUBLICATIONS

International Search Report and Written Opinion received for International Patent Application No. PCT/US2010/058796, mailed on Sep. 26, 2011, 9 pages.

(Continued)

*Primary Examiner* — Michael Thier
*Assistant Examiner* — Feben M Haile
(74) *Attorney, Agent, or Firm* — Forefront IP Lawgroup, PLLC

(57) ABSTRACT

Techniques for packet-loss handling for downlink Multi-User Multiple-input and Multiple-Output (DL MU-MIMO) wireless networking environment are described herein. The techniques described herein help define how a wireless access point should behave when faced with a packet-loss situation of a DL transmission burst in a MU-MIMO wireless network.

18 Claims, 5 Drawing Sheets

(56) References Cited

OTHER PUBLICATIONS

International Preliminary Report on Patentability and Written Opinion received for PCT Patent Application No. PCT/US2010/058796, mailed on Jul. 5, 2012, 6 pages.

Office Action received for European Patent Application No. 10843447.3, mailed on Jul. 31, 2012, 2 pages.

Office Action received for Korean Patent Application No. 10-2012-7014187, mailed on Sep. 10, 2012, 3 pages of English Translation and 4 pages of Office Action.

Office Action received for Chinese Patent Application No. 201010623214.6, mailed on Jun. 20, 2013, 16 pages of English Translation and 9 pages of Office Action.

Office Action received for Japanese Patent Application No. 2012-545988, mailed on Aug. 13, 2013, 4 pages of English Translation and 4 pages of Office Action.

Kawasaki et al., "Study on making transmission opportunities fair between terminals in IEEE802.11DCF", Information Processing Society Study Report, Information Processing Society of Japan, vol. 2006-61, Jun. 6, 2006, 9 pages.

* cited by examiner

PACKET-LOSS HANDLING FOR DOWNLINK MULTI-USER MULTIPLE-INPUT AND MULTIPLE-OUTPUT WIRELESS NETWORK

BACKGROUND

In response to the increased use of packet-loss sensitive traffic types (such as voice and multimedia) on wireless local area networks (WLANs), the Institute of Electrical and Electronics Engineers (IEEE) 802.11 Taskgroup E (802.11e) added quality of service (QoS) enhancements to the Media Access Control (MAC) layer of the IEEE 802.11 wireless network standard. That standard is currently documented here: IEEE std. 802.11-2007, published Jun. 12, 2007. Those QoS enhancements are part of the IEEE 802.11e amendment (IEEE std. 802.11-1995, published Nov. 11, 2005).

With a desire to increase throughput and range of WLANs, the IEEE Taskgroup N (802.11n) introduced Multiple-Input and Multiple-Output (MIMO) to the IEEE 802.11 standard. With MIMO, multiple receivers and transmitters in both a wireless access point (AP) and a wireless receiving station (STA) improve throughput and range. MIMO is one of the core technologies of the IEEE 802.11n amendment (IEEE std. 802.11-2009, published Oct. 29, 2009). The MIMO of IEEE 802.11n is single-user MIMO (SU-MIMO), where the STA receives the AP's signals via multiple antennas at the same time to improve signal coherence for that STA.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

How does a downlink Multi-User Multiple-Input and Multiple-Output (DL MU-MIMO) wireless network handle packet loss of a multi-packet multi-destination transmission? How would a wireless access point even know that a packet loss even occurred with such a transmission? The techniques described herein offer solutions.

In a DL MU-MIMO wireless network, it is possible that some of the wireless stations in the multi-packet multi-destination transmission do not receive their packets correctly from the wireless access point. Consequently, the stations that did not receive their packets will not send back acknowledgments (ACKs) to the access point, but the stations that did receive their packets will reply with ACKs.

The techniques described herein help define how an access point should behave when faced with the situation where there are some missing ACKs from a multi-packet multi-destination transmission in a DL MU-MIMO wireless network.

This brief introduction, including section titles and corresponding summaries, is provided for the reader's convenience and is not intended to limit the scope of the claims, nor the proceeding sections.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Exemplary Multi-User MIMO Wireless Network

Figure 1:
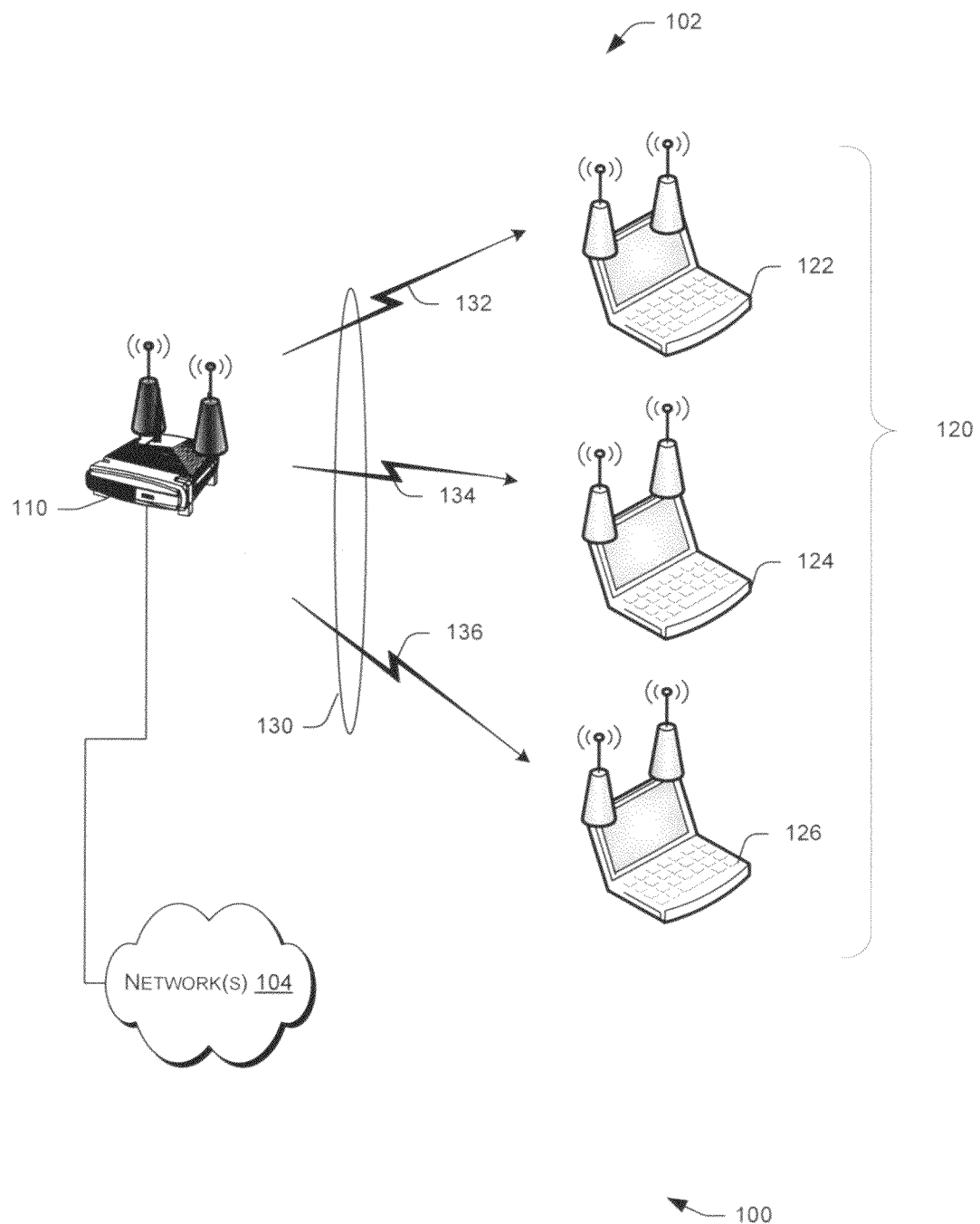
FIG. 1 illustrates an exemplary networking environment with a Multi-User Multiple-Input and Multiple-Output wireless network within which the techniques described herein may be implemented.

FIG. 1 illustrates an exemplary network 100. The exemplary network 100 may include a wireless local area network (WLAN) 102 and other communicatively linked networks 104 (wired, wireless, cellular, satellite, etc.), such as the Internet or other WLANs. The WLAN 102 may implement the described techniques for packet-loss handling procedures for downlink (DL) Multi-User MIMO (MU-MIMO) wireless networking. The WLAN 102 includes at least one wireless access point (AP) 110 and a group 120 of wireless receiving stations (STA) 122-126.

The AP 110 functions as a bridge between the group 120 of wireless STAs and the other communicatively linked networks 104. The AP 110 may be a dedicated network device. Alternatively, it may be a multi-purpose device or general-purpose computing device. For example, the AP 110 may be a bridge, a router, a repeater, a server, a client, or any other network device that can also function as a wireless access point for the WLAN 102.

Each of the STAs 122-126 may be a personal computer, a laptop, a mobile device, or any other computing device with the ability for wireless connectivity in a DL MU-MIMO wireless networking environment. Although not expressly shown in FIG. 1, each of the STAs 122-126 may include hardware, firmware, and/or software, which is configured to perform, at least in part, the techniques described herein.

As depicted, the DL MU-MIMO WLAN 102 is an infrastructure wireless network, but other implementations of WLAN may be used, such as a so-called "ad-hoc" network where the AP 110 is a member of the group of STAs 120.

The WLAN 102 is a MU-MIMO wireless network. A MU-MIMO network leverages having multiple and spatially distributed devices (e.g., STA group 120) in order to enhance the overall communication capabilities across the wireless network (e.g., WLAN 102). In contrast, conventional or single-user MIMO network considers only a local device having multiple antennas. With MU-MIMO, the AP 110 transmits a signal to multiple devices (here, it is STA group 120) in the same band simultaneously. This concept is called space-division multiple access or spatial-division multiple access (SDMA). With SDMA, the same section of the electromagnetic spectrum is used over multiple transmission paths. Often, those paths are formed by multibeam antennas and each beam is directed towards a different geographic or spatial area.

More particularly, FIG. 1 illustrates the downlink (DL) MU-MIMO wireless networking aspect of WLAN 102.

Alternatively, DL MU-MIMO is called MIMO broadcast. The AP 110 sends a multi-packet multi-destination transmission (i.e., burst) 130 to the STA group 120. That burst 130 includes packets destined for different stations. As illustrated in FIG. 1, a packet-destination indicator 132 indicates the direction of the packets of the burst 130 that are destined for STA 122. Similarly, packet-destination indicator 134 shows the direction of packets of the burst 130 that are destined for STA 124. Likewise, for packet-destination indicator 136 and STA 126.

The packet-destination indicators 132-136 indicate the downlink communication flow of the downlink burst 130, which is from the AP 110 to the STA group 120. Using DL MU-MIMO, the AP 110 can send a multi-packet multi-destination transmission 130 to multiple wireless stations as the same time. In other words, the AP 110 transmits different data packets to each of the STAs of the group 120 simultaneously. That means that at least some of each of the packets in the transmission is destined for different stations. That destination group is group 120 in FIG. 1 and may be called a "SDMA group" or a "DL MU-MIMO group" herein. Also, the multi-packet multi-destination transmission 130 is called a "SDMA transmission" or a "DL MU-MIMO burst" herein.

Packet-Loss Handling with IEEE 802.11

The IEEE 802.11 standard defines at least 5 physical layer protocols (e.g., 802.11, 802.11a, 802.11b, 802.11g, 802.11j, and 802.11n) and a MAC (Media Access Control) layer protocol. The original IEEE 802.11 MAC protocol has two medium access methods: Distributed Coordination Function (DCF) and Point Coordination Function (PCF). DCF builds upon code division multiple access (CSMA) with Collision Avoidance (CSMA/CA) and PCF is based on polling and provides contention-free access.

In DCF, there is no priority amongst different traffic types. DCF defines an exponential backoff procedure to improve stability under high-load conditions:

Backoff time=Random([0, CW])*aSlotTime
  Random([a,b]) returns a pseudo-random integer drawn from a uniform distribution over an interval [a, b]; aSlotTime is fixed time amount according to the physical layer
The contention window (CW) is increased exponentially every time when a collision occurs
Initially, CW=CWmin (which is minimum contention window)
Then, CW=min((CW+1)*2−1, CWmax) after every unsuccessful transmission; CWmax being the maximum contention window
CW is re-set to CWmin after a successful transmission With IEEE 802.11e amendment, Quality of Service (QoS) features were added to help handle packet-loss by adjusting conditions based upon data traffic types (e.g., video or voice). Such conditions include priority, transmit times, and reliability. With IEEE 802.11e, the MAC protocol has two new medium access methods: Enhanced Distributed Coordination Access (EDCA) and HCF (Hybrid Coordination Function) Controlled Channel Access (HCCA).

The EDCA protocol is a contention-based mechanism employing a contention window (CW) method with random backoff to determine which station (e.g., STA 122 or 124) within a network has the right to transmit signals. That is, when EDCA is employed, the various stations of a network will compete during a specific time period (e.g., contention window) to determine which station is permitted to transmit signals.

With EDCA, high priority traffic has a higher chance of being sent than low priority traffic. For example, a station with high priority traffic waits a bit less before it sends its next packet, in general, than a station with low priority traffic. In addition, each priority level is assigned its own Transmit Opportunity (TXOP). A TXOP defines the start time and the maximum duration during which a series of frames can be transmitted. If there is no TXOP (e.g., TXOP=0), then the station is limited to a single frame (e.g., MAC Service Data Unit).

EDCA specifies four types of data traffic access categories (AC), for example, voice, video, best-effort, and background. Each of these ACs has its own queue and its own set of EDCA parameters. Various parameters are configured for each access category. Examples of such parameters include:

CWmin—Minimum contention window size.
CWmax—Maximum contention window size
TXOP—specifies the maximum duration a station can transmit (per AC)
AIFSN—Arbitration Inter-Frame Space Number specifies the time interval (on a per AC basis) between the wireless medium becoming idle and the start of channel-access negotiation.

As in DCF, a station with data to send waits until the medium is idle, but with IEEE 802.11e, the station then waits an additional period. That additional period is determined by the AIFSN value for the AC being sent.

After the AIFSN period, the station generates a random number between the Minimum Contention Window (CWmin) and the Maximum Contention Window (CWmax) for the AC in use. The combination of AIFSN, CWmin and CWmax are typically configured so that, in most cases, high-priority data gains access to the network.

When an access point sends a data packet to a single station in a conventional WLAN, it expects to receive an acknowledgement (ACK) back from the station. If the access point does not get an ACK for the transmitted packet, it assumes that a collision has occurred and performs an exceptional backoff-retry procedure. The length of the backoff time for each retry increases (typically exponentially) as collisions continue to occur. The initial length of the backoff time interval may be, for example, defined as part of the DCF function in the original IEEE 802.11 MAC protocol. In the IEEE 802.11e MAC protocol, the backoff time interval may include an additional AIFSN time period as part of the ECDA function. Typically, the access point retries transmission until the backoff time period expires (e.g., backoff timer reaches zero). This is how packet loss is handled in the conventional approaches (such as IEEE 802.11e).

Packet-Loss Handling for DL MU-MIMO Wireless Network

In a DL MU-MIMO wireless network (e.g., WLAN 102 of FIG. 1), when a wireless access point (e.g., AP 110) sends a multi-packet multi-destination transmission (i.e., a DL MU-MIMO burst) to multiple stations (e.g., STA group 120), some of the stations (e.g., STA 124) do not receive their packets correctly. Consequently, the stations that do not receive their packets will not send back ACKs to the AP 110, but the stations that do receive their packets will reply with ACKs.

The techniques described herein help define how an AP 110 should behave when faced with the situation where there are some missing ACKs from a DL MU-MIMO group in response to a DL MU-MIMO burst.

Exemplary DL MU-MIMO Packet-Loss Handling System

Figure 2:
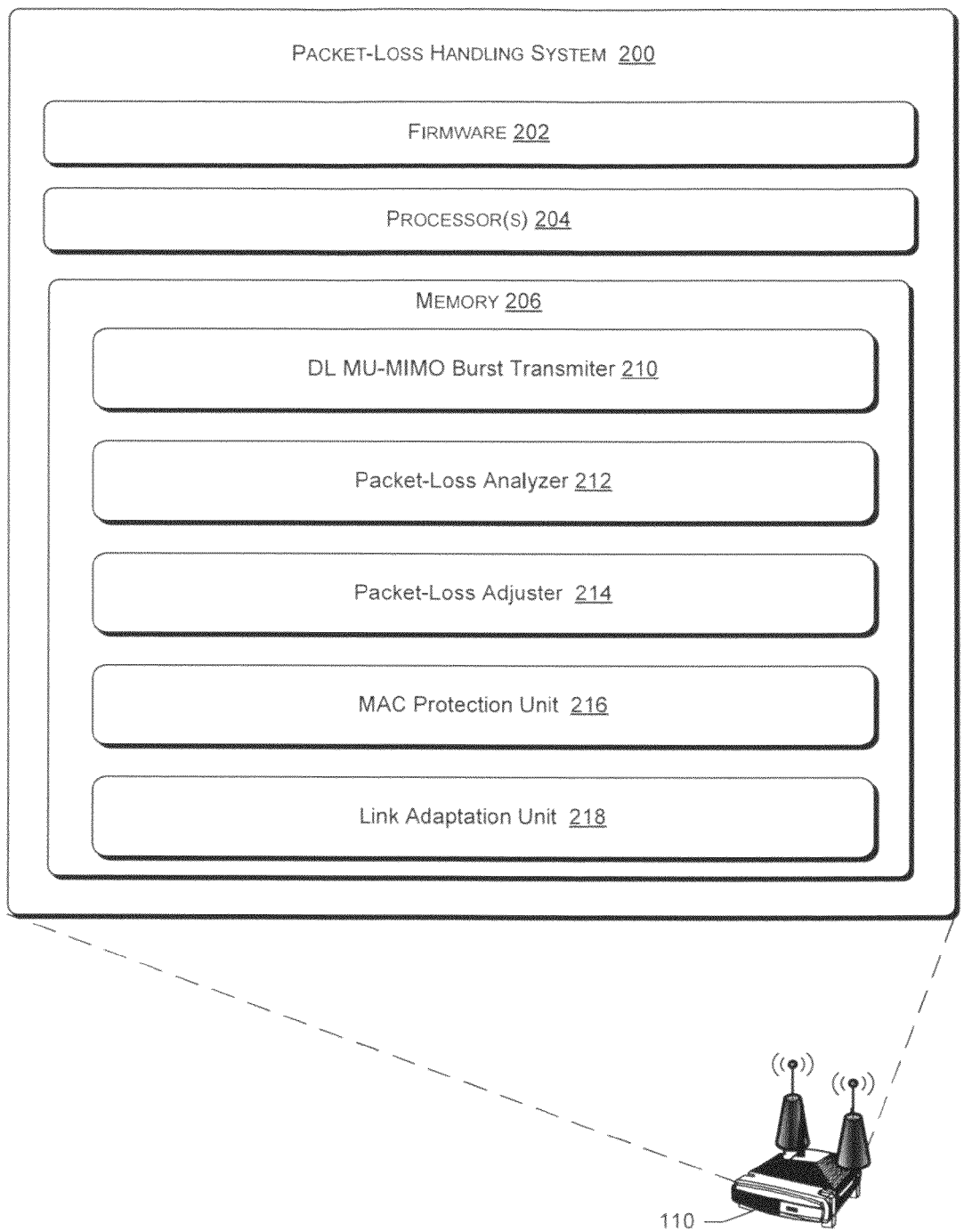
FIG. 2 is a block diagram of an exemplary wireless access point of FIG. 1 in greater detail. The illustrated portions implement techniques related to the packet-loss handling techniques described herein.

FIG. 2 shows the components of an exemplary packet-loss handling system 200 for DL MU-MIMO packet-loss handling. The exemplary packet-loss handling system 200 may be implemented as part of a wireless access point (e.g., AP 110) in a DL MU-MIMO wireless networking environment 102.

The exemplary packet-loss handling system 200 includes firmware 202, one or more processors 204, and memory 206. Residing in the memory 206 is one or more components 210-218. These components may be modules of computer-executable instructions, which are instructions executable on a computer, computing device, or the processors of such devices. While shown here as modules, the components may be embodied as hardware, firmware, software, or any combination thereof. The techniques described herein may be performed, as a whole or in part, by hardware, software, firmware, or some combination thereof.

The components include a DL MU-MIMO burst transmitter 210, a packet-loss analyzer 212, a packet-loss adjuster 214, a MAC protection unit 216, and a link adaptation unit 218.

The DL MU-MIMO burst transmitter 210 transmits DL MU-MIMO bursts (e.g., 130 of FIG. 1) to DL MU-MIMO group (e.g., 120 of FIG. 1). It also may perform any backoff delays or other interframe or interframe pauses. The DL MU-MIMO burst includes multiple packets, where one or more different packets of the multiple packets are destined for different ones of the group of wireless stations (e.g., 120 of FIG. 1).

The packet-loss analyzer 212 analyzes and determines whether any packets are lost from the DL MU-MIMO burst. Typically, a packet loss is determined to exist when an ACK is missing for one or more packets sent as part of the DL MU-MIMO burst. Those packets with a missing ACK are called "failed packets" herein and the stations with failed packets are called "failed STA" herein.

When it is determined that packet loss has occurred, the packet-loss adjuster 214 takes corrective actions. These actions presume that there is a bad channel condition and adjust so to account for the conditions. Examples of such actions include: 1) dropping maxed-out failed packets; 2) lower data rates; and/or 3) recover TXOP.

The packet-loss adjuster 214 may check to see if any of the failed packets (i.e., lost packets) have reached a defined maximum retry threshold. This threshold is defined automatically or manually. If manually, it may be specified by a user or administrator. The defined maximum retry threshold may limit the number of retries or the amount of data used for retries. If not, then the packet-loss adjuster increments a retry counter for those failed packets. If so, then drop those packets from the next burst. Alternatively, the packet-loss adjuster 214 may lower the data rate of the failed packets. This way, the amount of data sent in the packets to the failed STAs may succeed next time. Alternatively still, the packet-loss adjuster 214 may attempt to recover the TXOP by initiating another DL MU-MIMO burst. The burst is typically sent after a short interframe delay but before the expiration of the network allocation vector (NAV) timer. The short interframe delay may be, for example, SIFS (Short Interframe Space), PIFS (PCF InterFrame Space), or perhaps a DIFS (DCF Interframe Space). The packet-loss adjuster 214 may also lower the data rate for the retried packets. Typically, the retransmitted DL MU-MIMO burst includes data packets destined for the successful STAs and the failed STAs.

The MAC protection unit 216 determines whether MAC protection is on for failed STAs (or alternatively for the failed packets). If not, then the MAC protection unit 216 turns on MAC protection. It does this by initiating an RTS/CTS (Request To Send/Clear To Send) transaction with the failed STAs. Turning MAC protection on also establishes a TXOP (also called a "protected" TXOP) for the STA.

If the MAC protection is already on, then the link adaptation unit 218 lowers the data rate for the failed packets (and/or for the failed STAs). If the number of retransmissions exceeds a designated threshold, then the failed STA is removed from the DL MU-MIMO group. Alternatively, the threshold may be triggered by the number of or amount of data rate decreases. Consequently, no packets will be intended for the failed STAs in the next DL MU-MIMO burst. The link adaptation unit 218 may also aid in performing beamforming training for those failed STAs.

Exemplary Processes

Figure 3:
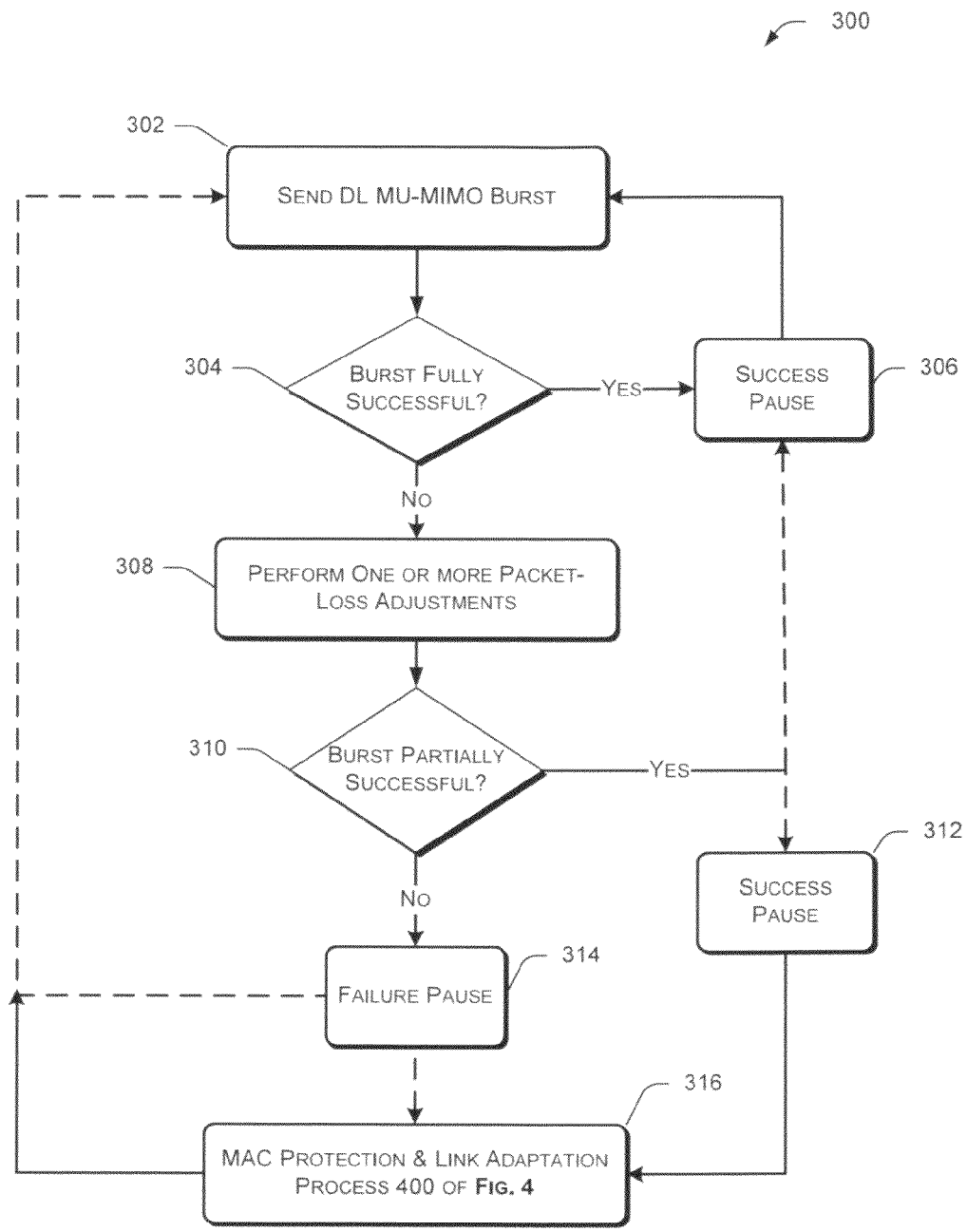
FIGS. 3-5 are flow diagrams of exemplary processes for packet-loss handling techniques described herein.
Figure 4:
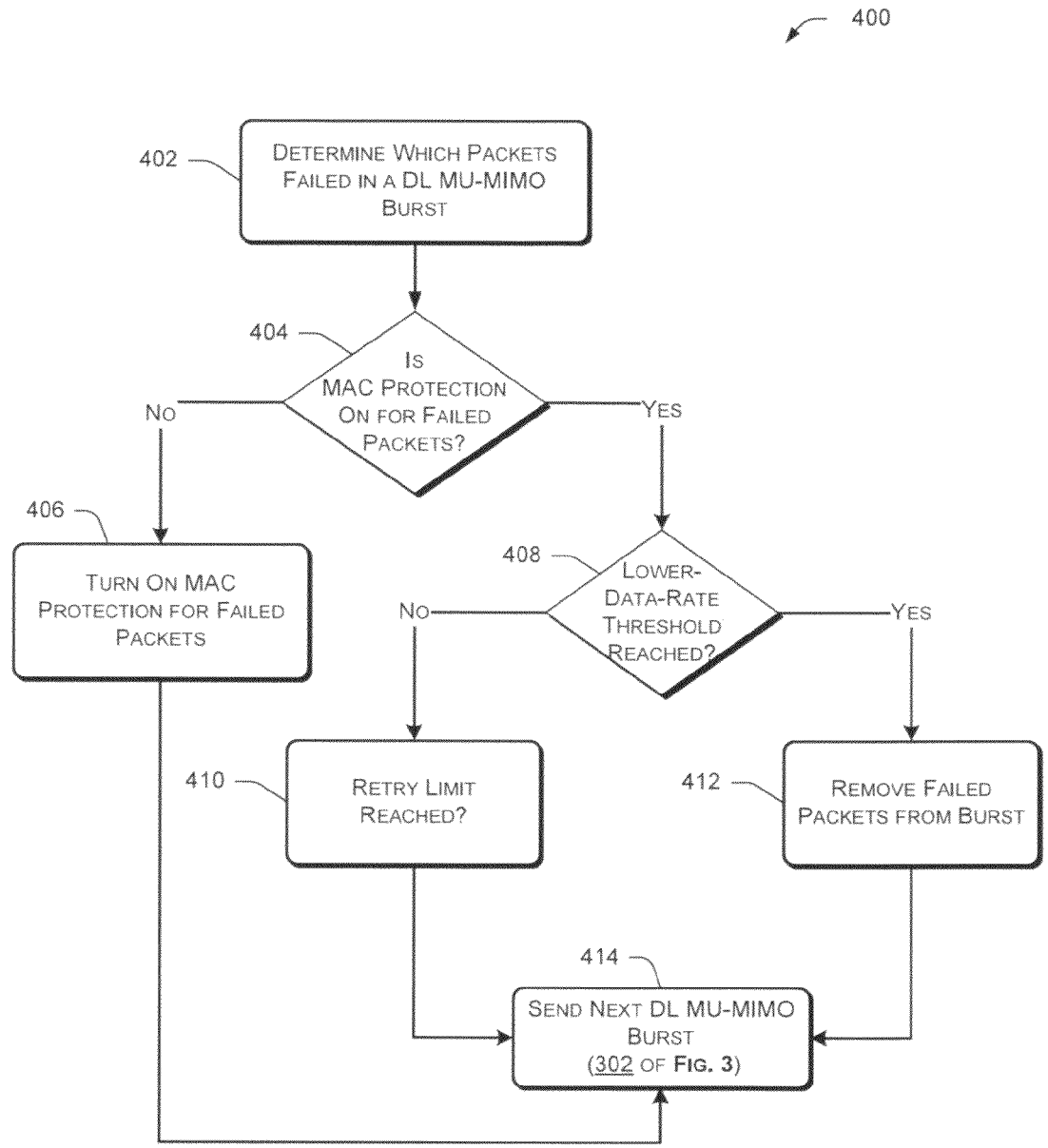
Figure 5:
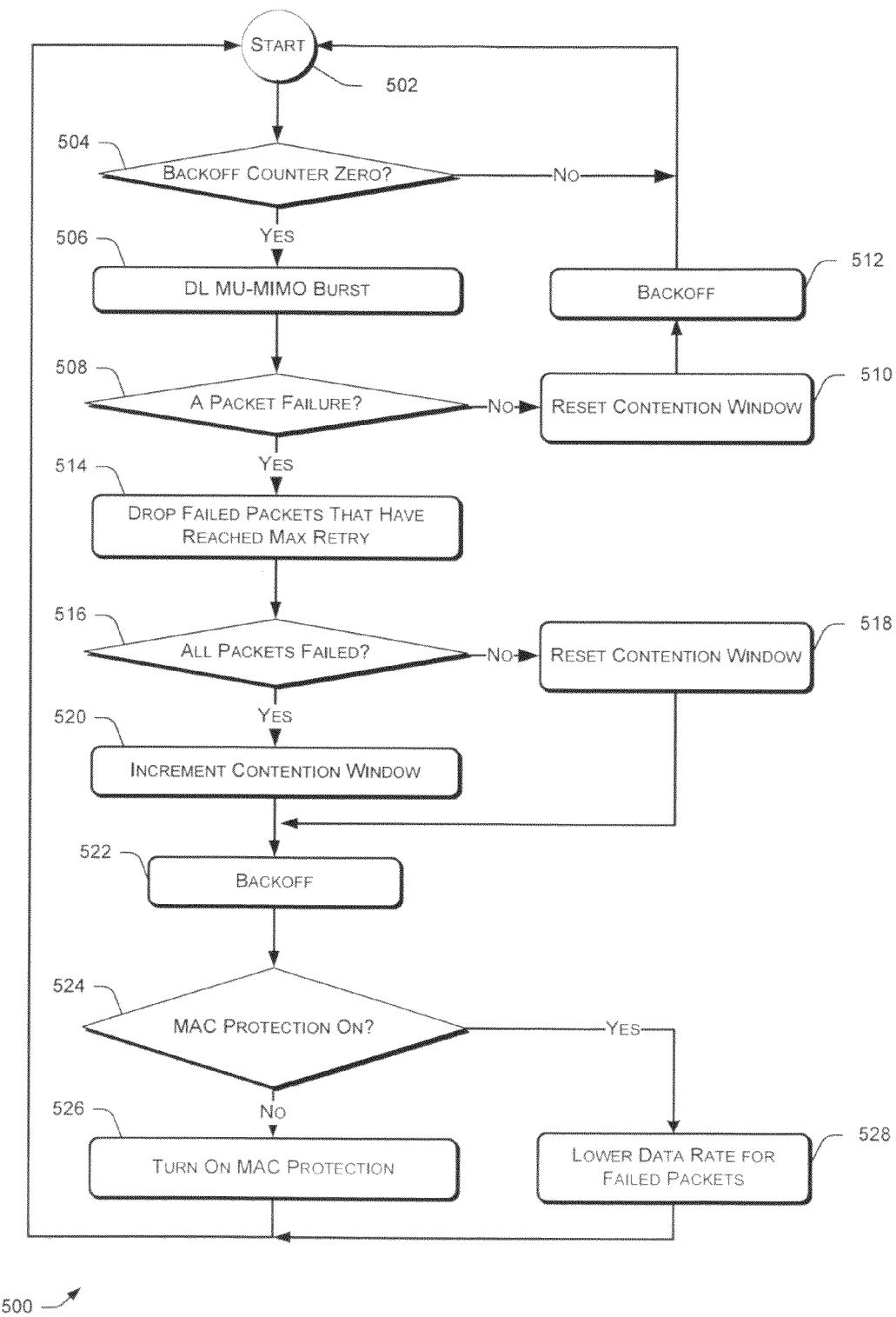

FIGS. 3-5 are flow diagrams illustrating exemplary processes 300, 400, and 500 that implements the techniques described herein for error-condition (e.g., packet-loss) handling for DL MU-MIMO wireless networking environments. Each of these processes is illustrated as a collection of blocks in a logical flow graph, which represents a sequence of operations that can be implemented in hardware, software, or a combination thereof. In the context of software, the blocks represent computer instructions that, when executed by one or more processors of such a computer, perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein.

FIG. 3 illustrates the process 300 for packet-loss handling in a DL MU-MIMO environment, which includes operation 302. At this operation, a wireless access point (such as AP 110), which is configured for DL MU-MIMO and packet-loss handling in such an environment, sends an initial or a next DL MU-MIMO burst (e.g., burst 130) to a DL MU-MIMO group (e.g., STA group 120). The wireless access point (such as AP 110) that is configured for DL MU-MIMO and packet-loss handling qualifies as a particular machine or apparatus.

At operation 304, the access point determines whether it received an acknowledgement (ACK) for each packet contained in the DL MU-MIMO burst that was sent in operation 302. The burst is considered fully successful if all of the packets sent as part of the burst are acknowledged by their destination stations (e.g., group 120 in FIG. 1). If it is fully successful, then the process 300 proceeds to operation 306; otherwise, it proceeds to operation 308.

When the burst transmission is fully successful, at operation 306, the access point performs a success pause. This may include, for example, resetting the contention window to be the designated minimum size for the contention window for the given traffic classification. This is represented by:

$$CW[AC]=CWmin[AC], \quad (1)$$

where AC is access category (or traffic type), CW[AC] is the contention window for that particular AC, and CWmin[AC] is the minimum contention window for that particular AC.

A success pause also includes starting a backoff timer. Typically, in a success situation, the backoff timer (i.e., counter) is set to a random number between zero and CW[AC]. The next burst will not transmit until the backoff timer reaches zero.

When the burst transmission is not fully successful, at operation 308, the access point performs one or more of the packet-loss adjustments. These adjustments presume that there is a bad channel condition and take one or more actions to account for those conditions. Examples of such actions include: 1) dropping maxed-out failed packets; 2) lower data rates; and/or 3) recover TXOP.

As part of the operation 308, the wireless access point (such as AP 110) may check to see if any of the failed packets has reached a defined maximum retry threshold. This threshold may be defined automatically or manually. If manually, it may be specified by a user or administrator. The defined maximum retry threshold may limit the number of retries or the amount of data used for retries. If not, then increment a retry counter for those failed packets. If so, then drop those packets from the next burst. Alternatively, the wireless access point (such as AP 110) may lower the data rate of the failed packets. This way, the amount of data sent in the packets to the failed STAs may succeed next time. Alternatively still, the wireless access point (such as AP 110) may attempt to recover the TXOP by initiating another DL MU-MIMO burst. The burst is typically sent after a short interframe delay but before the expiration of the network allocation vector (NAV) timer. The short interframe delay may be, for example, SIFS (Short Interframe Space), PIFS (PCF InterFrame Space), or perhaps a DIFS (DCF Interframe Space). The data rate for the retried packets may be lowered as well. Typically, the retransmitted DL MU-MIMO burst includes data packets destined for the successful STAs and the failed STAs.

The process 300 then proceeds to operation 310, at which point the wireless access point (such as AP 110) determines whether the burst (of operation 302) was partially successful. The burst is considered partially successful when at least one (but presumably not all) of the packets sent as part of the burst is acknowledged by a destination station (such as STA 122). If it is only partially successful, then, in one implementation, the process 300 proceeds to the success pause of operation 306 (described above); otherwise, it proceeds to the success pause of operation 312. Alternatively, in another implementation (with MAC protection and link adaptation), when only partially successful, the process 300 proceeds to the success pause of operation 312. This operation is another success pause like that of operation 306. However, unlike 306, operation 312 proceeds to MAC protection and link adaptation operation 316 rather than back to another burst transmission (such as operation 302).

When the burst transmission is not even partially successful (which means it completely fails), at operation 314, the wireless access point (such as AP 110), performs a failure pause. This may include, for example, increasing the contention window incrementally or exponentially. However, the set contention window size will not exceed the designated maximum size for the contention window for the given traffic classification. This is represented by:

$$CW[AC]=(CW[AC]+1)*2-1, \quad (2)$$

where AC is access category (or traffic type) and CW[AC] is the contention window for that particular AC.

A failure pause also includes starting a backoff timer. Typically, in a failure situation, the backoff counter is set to a random number between zero and CW[AC]. Of course, in this failure situation CW[AC] is probably greater than it is in the success situation. The next burst will not transmit until the backoff timer reaches zero.

After this, the process 300 may take one of two optional paths depending upon the implementation. It may return to operation 302 for the wireless access point (such as AP 110) to send the next DL MU-MIMO burst and begin the process anew. Alternatively, the process 300 may proceed to operation 316. That operation represents MAC protection and link adaptation process 400 of FIG. 4, which is described below. After that, the process 300 returns to operation 302 for the wireless access point (such as AP 110), to send the next DL MU-MIMO burst and begin the process once more.

FIG. 4 illustrates the process 400 for MAC protection and link adaptation and includes an operation 402. At this operation, a wireless access point (such as AP 110), which is configured for DL MU-MIMO and packet-loss handling in such an environment, determines which packets failed in a DL MU-MIMO burst (e.g., burst 130) to a DL MU-MIMO group (e.g., STA group 120). The wireless access point (such as AP 110), that is configured for DL MU-MIMO and packet-loss handling qualifies as a particular machine or apparatus.

At operation 404, the access point determines whether MAC protection is on for the failed stations (or alternatively for the failed packets). If MAC protection was off, then the process 400 proceeds to operation 406; otherwise, it proceeds to operation 408.

Next, at operation 406, the access point turns on MAC protection for the failed stations (or alternatively for the failed packets). This is accomplished at least in part by initiating an RTS/CTS (transaction with the failed STAs. Turning MAC protection on also establishes a TXOP (also called a "protected" TXOP) for the STA.

If the MAC protection is already on, then, at operation 408, the access point determines if a lower-data-rate threshold has been reached for the failed packets (or alternatively the failed stations). If a lower-data-rate threshold has been reached, then the process 400 proceeds to operation 412; otherwise, the process proceeds to operation 410.

At operation 410, the access point lowers the data rate for the failed packets (and/or for the failed STAs). Also, a lower-data-rate counter is incremented (or decremented) to track the number of or amount of data-rate decreases. From here, the process proceeds to operation 414.

If the number of or amount of data-rate decreases exceeds a designated threshold, then, at operation 412, the failed STA is removed from the DL MU-MIMO group. Consequently, no packets will be intended for the failed STAs in the next DL MU-MIMO burst.

Next, at operation 414, the process 400 ends and returns to operation 302 of process 300. So, the wireless access point (such as AP 110) sends the next DL MU-MIMO burst. Alternatively, at operation 414, the wireless access point (such as AP 110) may also perform beamforming training for the failed STAs.

FIG. 5 illustrates the process 500 for packet-loss handling for DL MU-MIMO networking environments. Process 500 includes a start 502. At operation 504, a wireless access point (such as AP 110), which is configured for DL MU-MIMO and packet-loss handling in such an environment, determines whether the backoff counter is zero. If not, then it returns to start 502 because the time is not right for sending the next DL MU-MIMO burst. If the backoff timer is zero, then, at operation 506, the wireless access point (such as AP 110) sends an initial or the next DL MU-MIMO burst (e.g., burst 130) to a DL MU-MIMO group (e.g., STA group 120). The wireless access point (such as AP 110) that is configured for DL MU-MIMO and packet-loss handling qualifies as a particular machine or apparatus.

Next, at operation 508, the wireless access point (such as AP 110) determines whether there has been a packet failure in the DL MU-MIMO burst of operation 506. If not, that means that the wireless access point (such as AP 110) received ACKs for all of the packets sent to the DL MU-MIMO group. If no packet failure, then the process proceeds to operation 510.

At operation 510, the access point resets the contention window to be the designated minimum size for the contention window for the given traffic classification. This reset is represented by equation (1).

Next, at operation 512, the access point starts a backoff timer and then returns to start 502.

If there is packet failure (which means the wireless access point received less than all of the ACKs for all of the packets sent to the DL MU-MIMO group), then, at operation 514, the wireless access point (such as AP 110), checks to see if any of the failed packets have reached a defined maximum retry threshold. This threshold may be defined automatically or manually. If manually, it may be specified by a user or administrator. The defined maximum retry threshold may limit the number of retries or the amount of data used for retries. If not, then increment a retry counter for those failed packets. If so, then the access point drops those packets from the from the DL MU-MIMO group. This way, they are not part of the next burst.

At operation 516, the wireless access point (such as AP 110) determines if all of the packets failed (or alternatively all of the STA failed). If even one packet did not fail, then the process presents to operation 518, where the contention window is reset in a manner like that of operation 510. The process skips operation 520 and instead proceeds to operation 522, which is a backoff operation.

If all of the packets failed, then the process proceeds to operation 520. Here, the wireless access point (such as AP 110) increases the contention window incrementally or exponentially. However, the set contention window size will not exceed the designated maximum size for the contention window for the given traffic classification. This may be done in accordance with equation (2).

At operation 522, a backoff timer is started. Typically, the backoff timer (i.e., counter) is set to a random number between zero and CW[AC].

Next, at operation 524, the wireless access point (such as AP 110) determines whether MAC protection is on for the failed stations (or alternatively for the failed packets). If MAC protection was off, then the process 500 proceeds to operation 526; otherwise, it proceeds to operation 528

If MAC protection is off, then, at operation 528, the wireless access point (such as AP 110) turns on MAC protection for the failed stations in the group 120 of wireless STA's (or alternatively for the failed packets). This is accomplished at least in part by initiating an RTS/CTS (transaction with the failed STAs.

If the MAC protection is already on, then, at operation 528, the wireless access point (such as AP 110) lowers the data rate for the failed packets (and/or for the failed STAs).

Alternatively, a lower-data-rate counter is incremented (or decremented) to track the number of or amount of data-rate decreases. The wireless access point (such as AP 110) determines if a lower-data-rate threshold has been reached for the failed packets (or alternatively the failed stations). If the number of or amount of data-rate decreases exceeds a designated threshold, then the failed STA is removed from the DL MU-MIMO group. Consequently, no packets will be intended for the failed STAs in the next DL MU-MIMO burst.

After operations 526 or 528, the process 500 returns to start 502.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method of packet-loss handling, the method comprising:
transmitting, by a wireless access point configured to operate in a downlink multi-user multiple-input and multiple-output (DL MU-MIMO) wireless networking environment, a DL MU-MIMO burst via a MU-MIMO wireless network to a DL MU-MIMO group of wireless stations;
determining whether the DL MU-MIMO burst transmission was fully successful; performing one or more packet-loss adjustments;
determining whether the DL MU-MIMO burst transmission was at least partially successful;
performing a failure backoff in response to a determination that the burst transmission was not even partially successful and before the sending of another DL MU-MIMO burst transmission, wherein a partially successful burst transmission is one where at least one station responds with an acknowledgment to a packet sent as part of the DL MU-MIMO burst transmission,
the performing the failure backoff includes:
setting a contention window to a value incrementally or exponentially greater than its immediately previous value but not exceeding a designated maximum contention window value for a type of traffic that is being transmitted represented by $$CW[AC]=(CW[AC]+1)*2-1,$$

where AC is the type of traffic and CW[AC] is the contention window for the type of traffic;
initiating a backoff timer; and
after a backoff time period expires, sending a next DL MU-MIMO burst transmission.

2. A method as recited in claim 1 further comprising:
determining which packets or wireless stations failed to respond with an acknowledgement (ACK) to the DL MU-MIMO burst transmission;
performing MAC protection for the packets or wireless stations that are determined to have failed.

3. A method as recited in claim 1 further comprising:
determining which packets or wireless stations failed to respond with an acknowledgement (ACK) to the burst transmission;
reducing a data rate for the packets or wireless stations that are determined to have failed.

4. A method as recited in claim 1 further comprising:
determining which packets or wireless stations failed to respond with an acknowledgement (ACK) to the burst transmission;
determining whether MAC protection is on for the packets or wireless stations that are determined to have failed;
in response to a determination that MAC protection is off for the packets or wireless stations that are determined to have failed, turning on MAC protection for those failed packets or wireless stations;
in response to a determination that MAC protection is on for the packets or wireless stations that are determined to have failed, reducing a designated transmission data rate for those failed packets or wireless stations.

5. A method as recited in claim 1 further comprising performing a success backoff in response to a determination that the burst transmission was fully successful and before the sending of another DL MU-MIMO burst transmission.

6. A method as recited in claim 1 further comprising performing a success backoff in response to a determination that the burst transmission was fully successful and before the sending of another DL MU-MIMO burst transmission, the performing the success backoff includes setting the backoff time period to a value that does not exceed a designated minimum contention window for a type of traffic being transmitted and initiating a backoff timer.

7. A method as recited in claim 1, wherein the packet-loss adjustments are performed in response to a determination that the burst transmission was not fully successful and the packet-loss adjustments adjust one or more subsequent DL MU-MIMO burst transmissions to account for any packet loss resulting from a less than fully successful DL MU-MIMO burst transmission.

8. A method as recited in claim 1, wherein performing one or more packet-loss adjustments comprises:
   determining which packets or wireless stations failed to respond with an acknowledgement (ACK) to the burst transmission;
   determining whether any of the failed packets or failed wireless stations have reached or exceed a defined maximum retry threshold;
   in response to a determination that a particular failed packet or wireless station has reached or exceed the defined maximum retry threshold, excluding that particular failed packet or wireless station from a subsequent DL MU-MIMO burst transmission.

9. A method as recited in claim 1, wherein performing one or more packet-loss adjustments comprises:
   determining which packets or wireless stations failed to respond with an acknowledgement (ACK) to the burst transmission;
   reducing a designated transmission data rate for those failed packets or wireless stations.

10. A method as recited in claim 1, wherein performing one or more packet-loss adjustments comprises:
    determining which packets or wireless stations failed to respond with an acknowledgement (ACK) to the burst transmission;
    recovering transmit opportunity (TXOP) for those failed packets or failed wireless stations by initiating another DL MU-MIMO burst transmission.

11. A method as recited in claim 1, wherein performing one or more packet-loss adjustments comprises:
    determining which packets or wireless stations failed to respond with an acknowledgement (ACK) to the burst transmission;
    recovering transmit opportunity (TXOP) for those failed packets or failed wireless stations by initiating another DL MU-MIMO burst transmission after an interframe delay but before expiration of a network allocation vector.

12. A method as recited in claim 1 further comprising performing a failure backoff in response to a determination that the burst transmission was not even partially successful and before the sending of another DL MU-MIMO burst transmission, wherein a partially successful burst transmission is one where at least one station responds with an acknowledgment to a packet sent as part of the DL MU-MIMO burst transmission.

13. A method comprising:
    transmitting, by a wireless access point configured to operate in a downlink multi-user multiple-input and multiple-output (DL MU-MIMO) wireless networking environment, a DL MU-MIMO burst via a MU-MIMO wireless network to a DL MU-MIMO group of wireless stations;
    determining whether the burst transmission was fully successful;
    in response to a determination that the burst transmission was not fully successful, performing a failure backoff in response to a determination that the burst transmission was not even partially successful and before the sending of another DL MU-MIMO burst transmission, wherein a partially successful burst transmission is one where at least one station responds with an acknowledgment to a packet sent as part of the DL MU-MIMO burst transmission, the performing the failure backoff includes:
    setting a contention window to a value incrementally or exponentially greater than its immediately previous value but not exceeding a designated maximum contention window value for a type of traffic that is being transmitted represented by $$CW[AC]=(CW[AC]+1)*2-1,$$

where AC is the type of traffic and CW[AC] is the contention window for the type of traffic;
    detecting at least a partial failure of the DL MU-MIMO burst transmission;
    in response to the detecting, determining which packets or wireless stations failed to respond with an acknowledgement (ACK) to the DL MU-MIMO burst transmission; and
    determining whether MAC protection is on for the packets or wireless stations that are determined to have failed, wherein the MAC protection establishes transmission opportunity for the failed packets or wireless stations.

14. A method as recited in claim 13 further comprising in response to a determination that MAC protection is off for the packets or wireless stations that are determined to have failed, turning on MAC protection for those packets or wireless stations.

15. A method as recited in claim 13 further comprising in response to a determination that MAC protection is on for the packets or wireless stations that are determined to have failed, reducing a designated transmission data rate for those packets or wireless stations.

16. A method as recited in claim 13, the method further comprising:
    determining whether the burst transmission was fully successful;
    in response to a determination that the burst transmission was not fully successful, performing a packet-loss adjustment by:
    determining whether any of the failed packets or failed wireless stations have reached or exceeded a defined maximum retry threshold;
    in response to a determination that a particular failed packet or wireless station has reached or exceed the defined maximum retry threshold, excluding that particular failed packet or wireless station from a subsequent DL MU-MIMO burst transmission.

17. A system comprising:
    a burst transmitter configured to transmit a downlink multi-user multiple-input and multiple-output (DL MU-MIMO) burst to a DL MU-MIMO group of wireless stations via a MU-MIMO wireless network, the DL MU-MIMO burst comprising multiple packets, where one or more different packets of the multiple packets are destined for different ones of the DL MU MIMO group of wireless stations;
    a packet-loss analyzer configured to determine whether one or more packets of the DL MU-MIMO burst were lost,
    in response to a determination that the burst transmission was not fully successful, performing a failure backoff in response to a determination that the burst transmission was not even partially successful and before the sending of another DL MU-MIMO burst transmission, wherein a partially successful burst transmission is one where at least one station responds with an acknowledgment to a packet sent as part of the DL MU-MIMO burst transmission, the performing the failure backoff includes:
  setting a contention window to a value incrementally or exponentially greater than its immediately previous value but not exceeding a designated maximum contention window value for a type of traffic that is being transmitted represented by $$CW[AC]=(CW[AC]+1)*2-1,$$

where AC is the type of traffic and CW[AC] is the contention window for the type of traffic;
a packet-loss adjuster configured to respond to a packet loss determination by the packet-loss analyzer by taking corrective action to account for the determined packet loss; and
a MAC protection unit configured to turn MAC protection on for lost packets or for wireless stations having lost packets when MAC protection is off, wherein the MAC protection establishes transmission opportunity for the failed packets or wireless stations.

18. A system as recited in claim 17 further comprising a link adaptation unit configured to reduce designated transmission data rate for lost packets or for wireless stations having lost packets so that one or more subsequent burst transmissions by the burst transmitter utilizes the reduced designated data rate for the packets or for wireless stations having lost packets.

* * * * *

UNITED STATES PATENT AND TRADEMARK OFFICE
CERTIFICATE OF CORRECTION

PATENT NO. : 8,705,340 B2
APPLICATION NO. : 12/655086
DATED : April 22, 2014
INVENTOR(S) : Michelle Xiaohong Gong et al.

Page 1 of 1

It is certified that error appears in the above-identified patent and that said Letters Patent is hereby corrected as shown below:

In the Claims:

In column 12, line 58, in claim 17, delete "DL MU MIMO" and insert -- DL MU-MIMO --, therefor.

Signed and Sealed this
Fifteenth Day of July, 2014

Michelle K. Lee
*Deputy Director of the United States Patent and Trademark Office*